(12) United States Patent
Anders et al.

(10) Patent No.: US 9,992,042 B2
(45) Date of Patent: Jun. 5, 2018

(54) PIPELINED HYBRID PACKET/CIRCUIT-SWITCHED NETWORK-ON-CHIP

(71) Applicant: Intel Corporation, Santa Clara, CA (US)

(72) Inventors: Mark A. Anders, Hillsboro, OR (US); Himanshu Kaul, Portland, OR (US); Gregory K. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 14/574,189

(22) Filed: Dec. 17, 2014

(65) Prior Publication Data

US 2016/0182256 A1    Jun. 23, 2016

(51) Int. Cl.
| | |
|---|---|
| *H04L 12/66* | (2006.01) |
| *H04L 12/64* | (2006.01) |
| *H04L 12/933* | (2013.01) |
| *H04L 12/50* | (2006.01) |
| *H04L 12/24* | (2006.01) |
| *G06F 15/78* | (2006.01) |

(52) U.S. Cl.
CPC .......... *H04L 12/64* (2013.01); *G06F 15/7825* (2013.01); *H04L 12/50* (2013.01); *H04L 12/6418* (2013.01); *H04L 12/66* (2013.01); *H04L 41/02* (2013.01); *H04L 49/109* (2013.01); *Y02D 10/12* (2018.01); *Y02D 10/13* (2018.01)

(58) Field of Classification Search
CPC ..... H04L 12/64; H04L 12/50; H04L 12/6418; H04L 12/66; H04L 41/02
See application file for complete search history.

(56) References Cited

U.S. PATENT DOCUMENTS

| | | | |
|---|---|---|---|
| 8,284,766 B2 | 10/2012 | Anders et al. | |
| 2006/0056421 A1* | 3/2006 | Zaki | H04L 1/1664 370/400 |
| 2009/0210184 A1* | 8/2009 | Medardoni | H03K 3/011 702/89 |
| 2013/0148506 A1* | 6/2013 | Lea | H04L 47/32 370/236 |
| 2013/0188486 A1 | 7/2013 | Thacker et al. | |
| 2014/0119363 A1* | 5/2014 | Solihin | H04L 49/109 370/352 |
| 2015/0071282 A1 | 3/2015 | Anders et al. | |

(Continued)

FOREIGN PATENT DOCUMENTS

WO   WO 2014/209391   12/2014

OTHER PUBLICATIONS

International Search Report and Written Opinion in International Application No. PCT/US2015/062028 dated Feb. 26, 2016.

(Continued)

*Primary Examiner* — Jutai Kao
(74) *Attorney, Agent, or Firm* — Alliance IP, LLC

(57) ABSTRACT

A packet-switched request from a first router of a network-on-chip is received. The packet-switched request is generated by source logic of the network-on-chip. Circuit-switched data associated with the packet switched request is also received. The circuit-switched data is stored by a storage element. The circuit-switched data is sent towards destination logic identified in the packet-switched request.

19 Claims, 8 Drawing Sheets

(56) References Cited

U.S. PATENT DOCUMENTS

2015/0188829 A1 7/2015 Satpathy et al.
2015/0220470 A1 8/2015 Chen et al.

OTHER PUBLICATIONS

Jen-Tu Wang et al., "A Hybrid on-Chip Network with a Low Buffer Requirement", 2014 20th IEEE International Conference on Parallel and Distributed Systems (ICPADS), Hsinchu, Dec. 16, 2014, pp. 273-280.

Mark Anders et al., "A 2.9Tb/s 8W 64-core Circuit-Switched Network-on-Chip in 45 nm CMOS", 2008 34th European Solid-State Circuits Conference. ESSCIRC 2008, Edinburgh, Sep. 15, 2008, pp. 182-185.

Nicola Concer et al., "The Connection Then-Circuit Flow Control Protocol for Heterogeneous Multicore Systems-on-Chip", IEEE Transactions on Computer-Aided Design of Integrated Circuits and Systems, Jun. 2010, vol. 29, Issue 5, pp. 869-882.

Anders, et al., "A 2.9Tb/s 8W 64-Core Circuit-Switched Network-on-Chip in 45 nm CMOS," IEEE, 2008, 978-1-4244-2362-0/08 (pp. 182-185).

Anders et al., "A 4.1Tb/s Bisection-Bandwidth 560Gb/s/W Streaming Circuit-Switched 8x8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

Chen et al., "A 340mV-to-0.9V 20.2Tb/s Source-Synchronous Hybrid Packet/Circuit-Switched 16x16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

International Preliminary Report and Patentability in International Application No. PCT/US2015/062028 dated Jun. 29, 2017, 7 pages.

\* cited by examiner

PIPELINED HYBRID PACKET/CIRCUIT-SWITCHED NETWORK-ON-CHIP

FIELD

The present disclosure relates in general to the field of computer development, and more specifically, to a pipelined hybrid packet/circuit-switched network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. Hybrid packet/circuit-switched NoCs enable high throughput and utilization of packet-switching with energy efficiency approaching circuit-switched data propagation.

BRIEF DESCRIPTION OF THE DRAWINGS

Like reference numbers and designations in the various drawings indicate like elements.

DETAILED DESCRIPTION

Figure 1:
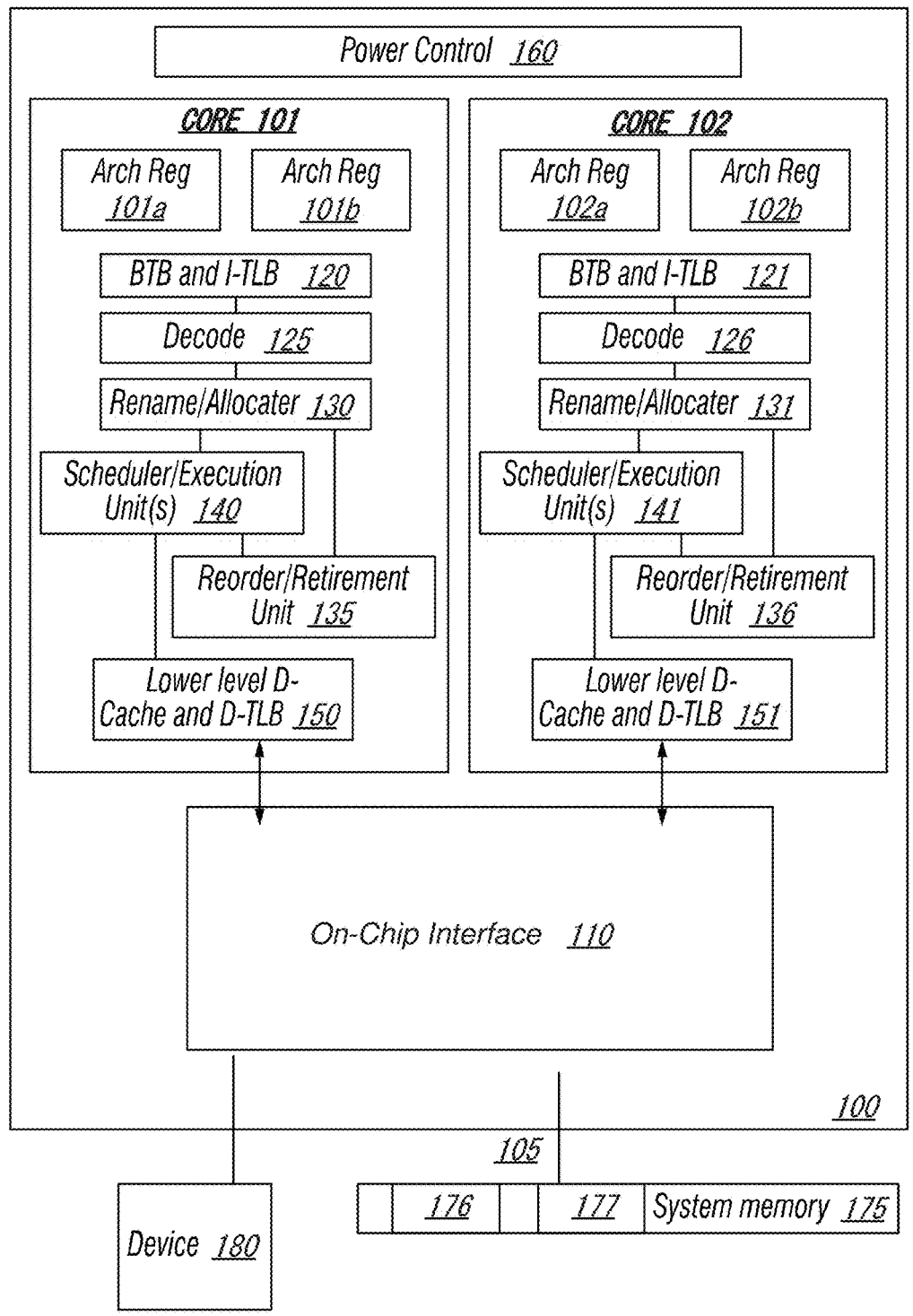
FIG. 1 illustrates a block diagram for an example computing system including a multicore processor in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
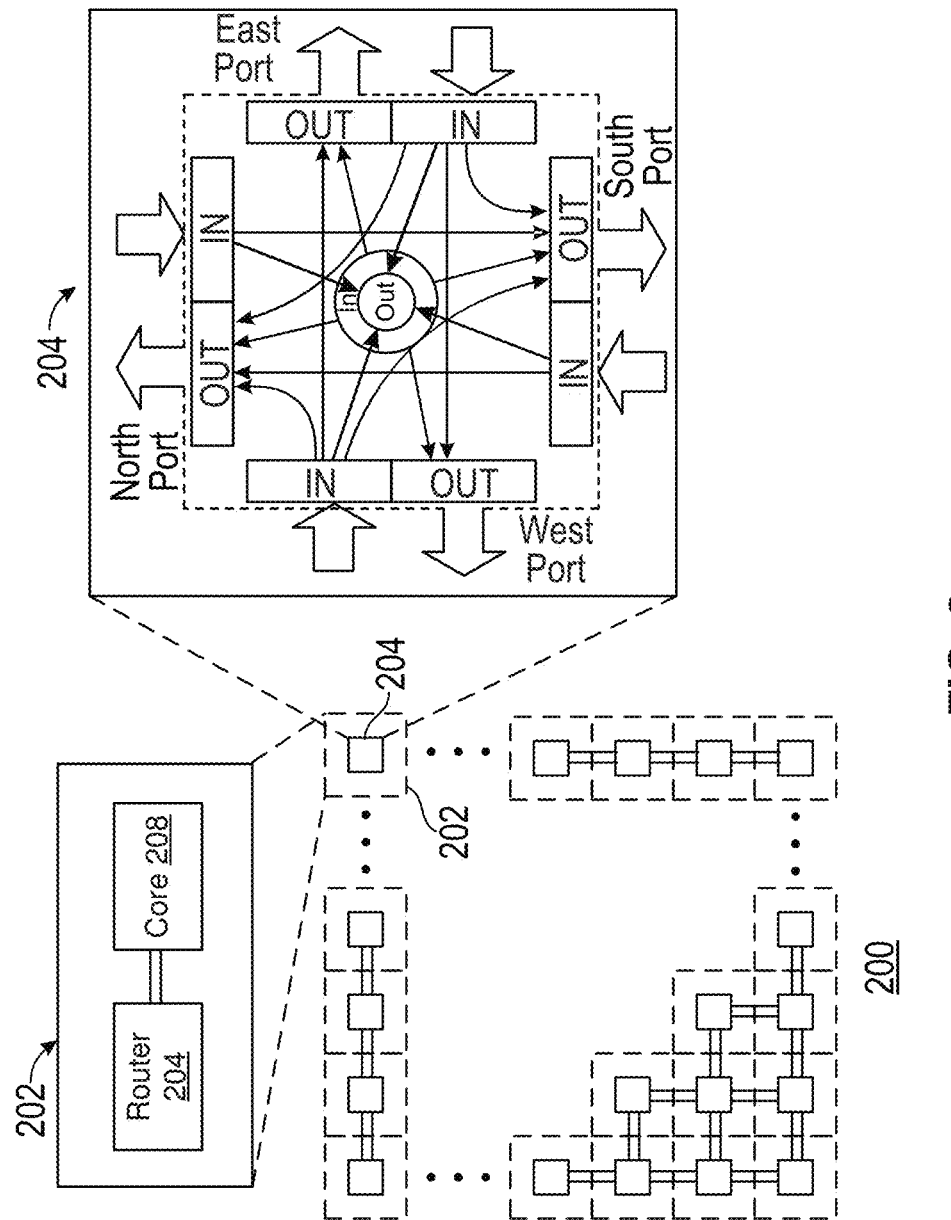
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. The packets may be received, transmitted and processed by the routers 204. The packet switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Pure packet-switched networks have at least one stage of flip-flops in each router, resulting in significant power and latency overhead to achieve high throughput. Hybrid packet-/circuit-switched NoCs combine the energy-efficiency of circuit switching with the higher resource utilization of packet-switching. Circuit-switched data transfers within these hybrid networks are energy efficient because of the elimination of data storage circuits between source and destination. However, circuit-switched channels reserved during long distance data transfers may block other transfers for long periods of time resulting in lower than optimal throughput. Various embodiments of the present disclosure add pipeline stages to circuit-switched NoCs within the hybrid packet-/circuit-switched framework. Circuit-switched data may be flopped at the pipeline stages. Circuit-switched channels may receive a circuit-switched acknowledgment signal when data reaches the pipeline flip-flops. Placing several credit-1 pipeline stages across a large NoC breaks the long distance transfers into several short transfers with minimal energy overhead. Careful placement of the pipeline stages may provide significant performance improvement with minimal energy overhead. Pipelined stages may be used in both synchronous and source-synchronous NoCs. Both the synchronous and source-synchronous implementations can scale to larger networks with multiple pipelined routers.

Figure 3A:
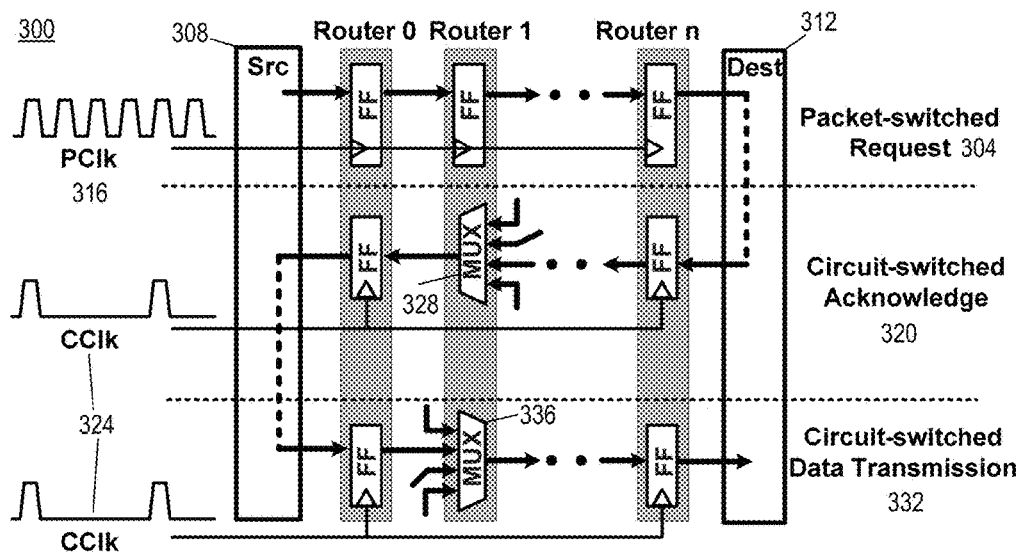
FIG. 3A illustrates example communications in an example system for a synchronous hybrid packet/circuit-switched NoC in accordance with certain embodiments.

FIG. 3A illustrates example communications in an example system 300 for a synchronous hybrid packet/circuit-switched NoC in accordance with certain embodiments. A synchronous NoC may utilize explicit clocks and level sensitive control signals. A synchronous packet-switched NoC may comprise routers that communicate with their neighbors based on a global clock. Thus, all the routers in a synchronous NoC operate at the same frequency. The communications depicted may be performed in an NoC of a processor, such as processor 200. Each router depicted may have any suitable characteristics described herein with respect to routers 204.

In an embodiment, the communications include an exchange of a packet-switched reservation request 304 to configure the circuit-switched pathway. Source logic 308 (e.g., a core 208) may send the reservation request to destination logic 312 (e.g., a different core 208). Reservation request 304 may travel through n+1 routers on its way to the destination and the reservation request 304 is flopped at each router. The reservation request 304 may be transferred between routers based on a packet clock 316, such as a 2 GHz clock. The reservation packet 304 may be communicated via a packet-switched portion of the NoC and may reserve resources for data communication between source logic 308 and destination logic 312 as the reservation packet travels from the source to the destination.

The reservation packet 304 may include any suitable information facilitating the reservation of a circuit-switched channel. As an example, the reservation packet may include an address associated with the destination logic 312 and optional sideband packet data. The reservation packet is forwarded downstream based on the destination address when resources are available. For example, based on a deterministic routing method (e.g., X-first, Y-second routing or a table lookup) or other routing protocol performed by a direction decoder in the given router, the reservation packet is forwarded along on a path from the source logic 308 to the destination logic 312. In an embodiment, a unique address may be associated with each core 208 or other logic block (and thus router 204 in cases where there is a 1:1 mapping between cores and routers). In turn, this local address may be used to generate direction information local to each router to identify the appropriate port of the router for sending the information. Thus, the destination address may be used in conjunction with the local address of the router 204 to determine which direction to forward an incoming packet. A circuit enable signal may be used to determine whether the incoming packet is reserving a circuit-switched path. If the circuit enable signal is not asserted, no circuit-switched path is set up, and the packet merely carries the sideband packet data.

After the reservation packet 304 reaches the destination logic 312, a circuit-switched acknowledge signal 320 is sent from the destination logic 312 to the source logic 308. Although not shown, in some embodiments (such as those utilizing queue slots to store information associated with reservation requests), an acknowledge signal may also be sent from the source logic 308 to the destination logic 312 at the same time the acknowledge signal 320 is sent from the destination logic 312 to the source logic 308. The acknowledge signal 320 confirms configuration of the circuit-switched path reserved by the reservation request 304. The acknowledge signal 320 is flopped at the router (router n) coupled to the destination logic 312 and then again at the router (router 0) coupled to the source logic 308, but is otherwise passed through the various routers of the network without being stored. As depicted in router 1, the acknowledge signal 320 may pass through multiplexing logic 328 at each router in between router n and router 0. The multiplexing logic 328 at each router is configured based on direction information generated in response to the reservation request 304. Multiplexing logic 328 may act to couple an input port of a router to the correct output port of the router to allow the acknowledge signal 320 to travel the correct path from destination logic 312 to source logic 308.

The acknowledge signal 320 is clocked by circuit clock 324. To improve data throughput, different clocks may be used synchronize the packet-switched and circuit-switched portions of the network. A packet-switched request may travel between neighboring routers for each cycle of packet clock 316, whereas circuit-switched data may travel across the whole network in a single cycle of circuit clock 324. Accordingly, a packet-switched portion of a network may operate with a higher frequency clock than a circuit-switched portion of the network. In a particular embodiment, packet clock 316 operates at a frequency of 2 GHz, while circuit clock 324 operates at a frequency of 500 MHz, though any suitable frequencies may be used for these clocks.

After the acknowledge signal 320 is received by the source logic 308, circuit-switched data 332 is sent from the source logic 308 to the destination logic 312. The data 332 is flopped at the router (router 0) coupled to the source logic 308 and then again at the router (router n) coupled to the destination logic 312, but is otherwise passed through the various routers of the network without being stored. As depicted in router 1, the data 332 may pass through multiplexing logic 336 at each router in between router 0 and router n. The multiplexing logic 336 at each router is configured based on direction information generated in response to the reservation request 304. Multiplexing logic 336 may act to couple an input port of a router to the correct output port of the router to allow the data 332 to travel the correct path from source logic 308 to destination logic 312. The transmission of data 332 is clocked by circuit clock 324.

In various embodiments, a circuit-switched data transmission may be taking place concurrently with an exchange of acknowledges for one or more future transmissions and/or concurrently with an exchange of one or more packet-switched requests for circuit-switched paths to be configured. Accordingly, a router participating in the circuit-switched exchanges may prepare for future circuit-switched path configurations by determining and storing the routing direction for a future data transmission.

Figure 3B:
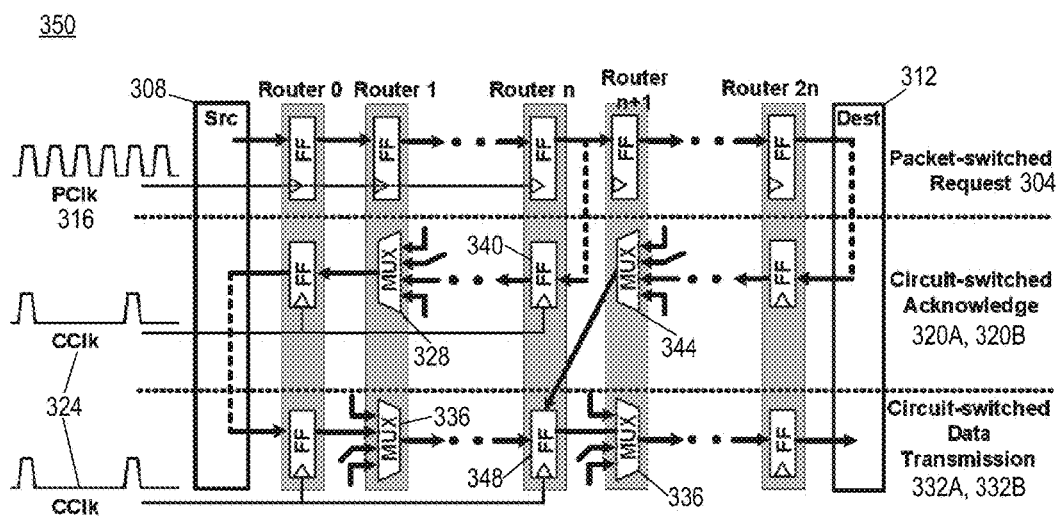
FIG. 3B illustrates an example system with pipelined circuit-switched control and data channels for a synchronous hybrid packet/circuit-switched NoC in accordance with certain embodiments.

FIG. 3B illustrates an example system 350 with pipelined circuit-switched control and data channels for a synchronous hybrid packet/circuit-switched NoC in accordance with certain embodiments. In the embodiment depicted, a pipeline stage is inserted in the middle of the circuit switched channels at router n. As in the non-pipelined system, packet-switched requests 304 propagate from source logic 308 to destination logic 312, reserving the circuit-switched channel along the way. In the pipelined embodiment, however, a circuit-switched acknowledge signal 320A propagates back to the source logic 308 from the pipeline boundary in the middle as soon as the request packet passes that point. The acknowledge signal may be stored at router n (e.g., via flip flop 340) and then again at router 0 while passing through multiplexing logic 328 of any other intervening routers without being stored. Although not shown, in some embodiments (such as those utilizing queue slots to store information associated with reservation requests), an acknowledge signal may also be sent from the source logic 308 to the pipeline stage (e.g., router n) at the same time the acknowledge signal 320A is sent from the pipeline stage to the source logic 308. When the acknowledge signal 320A has reached the source logic 308, the circuit switched data signal 332A may be transmitted to the middle pipeline stage (once resources for a circuit-switched channel between the source logic 308 and the pipeline stage are available) where it is stored in a set of flip-flops 348 while waiting for an additional circuit-switched acknowledge signal 320B to be received. When the request packet 304 reaches the destination logic 312, the additional acknowledge signal 320B propagates from the destination logic 312 back to the pipeline stage, where a control signal from multiplexing logic 344 of router n+1 causes the flip-flop set 348 to provide the circuit-switched data signal 332B (which has the same content as 332A but is sent later in time) to be transmitted along the second half of the path to the destination logic 312 once circuit-switched channel resources are available. Although not shown, in some embodiments (such as those utilizing queue slots to store information associated with reservation requests), an acknowledge signal may also be sent from the pipeline stage to the destination logic 312 at the same time the acknowledge signal 320B is sent. However, if the pipeline stage has not yet received the circuit-switched data 332A, the acknowledgement sent from the pipeline stage may be postponed until the data 332A is received at the pipeline stage. In such embodiments, the circuit clock 324 cycle may be shortened to half of the original, improving network throughput. Although, the embodiment depicted shows a single pipeline stage, any suitable number of pipeline stages may be used in the NoC and may be placed at any suitable locations.

Figure 4A:
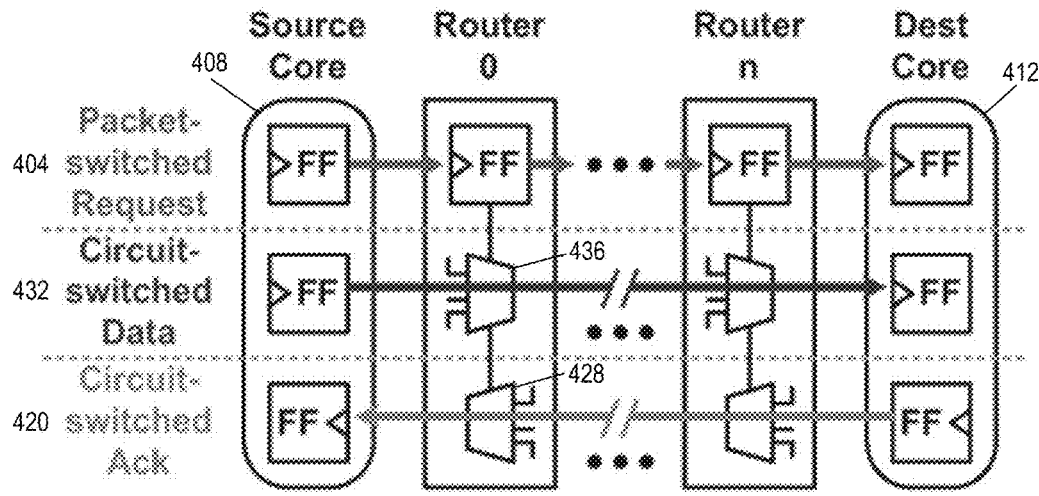
FIG. 4A illustrates example communications in an example system for a source-synchronous hybrid packet/circuit-switched NoC in accordance with certain embodiments.

FIG. 4A illustrates example communications in an example system 400 for a source-synchronous hybrid packet/circuit-switched NoC in accordance with certain embodiments. In source-synchronous NoCs, control signal transitions forwarded along with the data act as clock signals, thus eliminating the need for a fully-synchronous clock. For example, in an embodiment two forward control signals are implemented (a stream signal and a tail signal) that both designate a data transfer. The stream signal indicates communication of circuit data with more data to follow (as additional segments) and thus keeps the circuit channel open for a complete circuit data transfer (of one or more segments) and the tail signal indicates an end of a circuit data transfer. Source-synchronous techniques facilitate multi-clock designs (wherein cores associated with different routers may operate at different frequencies) by removing the need for synchronizing FIFOs at each router.

In an embodiment, the communications include an exchange of a packet-switched reservation request 404 to configure the circuit-switched pathway. Source logic 408 (e.g., a core 208) may send the reservation request to destination logic 412 (e.g., a different core 208). Reservation request 404 may travel through n+1 routers on its way to the destination and the reservation request 404 is flopped at each router. The reservation packet 404 may be communicated via a packet-switched portion of the NoC and may reserve resources for data communication between source logic 408 and destination logic 412 as the reservation packet travels from the source to the destination.

The reservation packet 404 may include any suitable information facilitating the reservation of a circuit-switched channel. As an example, the reservation packet may include an address associated with the destination logic 412 and optional sideband packet data. The reservation packet is forwarded downstream based on the destination address when resources are available. For example, based on a deterministic routing method (e.g., X-first, Y-second routing or a table lookup) or other routing protocol performed by a direction decoder in the given router, the reservation packet is forwarded along on a path from the source logic 408 to the destination logic 412. In an embodiment, a unique address may be associated with each core 208 or other logic block (and thus router 204 in cases where there is a 1:1 mapping between cores and routers). In turn, this local address may be used to generate direction information local to each router to identify the appropriate port of the router for sending the information. Thus, the destination address may be used in conjunction with the local address of the router 204 to determine which direction to forward an incoming packet. A circuit enable signal may be used to determine whether the incoming packet is reserving a circuit-switched path. If the circuit enable signal is not asserted, no circuit-switched path is set up, and the packet merely carries the sideband packet data.

After the reservation packet 404 reaches the destination logic 412, circuit-switched data 432 is sent from the source logic 408 to the destination logic 412. In some embodiments, the transfer of the circuit-switched data may begin before the reservation request reaches the pipeline stage, but the circuit-switched channel is only configured up to the last router that has processed the packet-switched request. Thus, the circuit-switched data will not be received at the pipeline stage until after the packet-switched request has reached the pipeline stage. The data 432 is flopped at the source logic 408 and then again at the destination logic 412, but is passed through the various routers of the network without being stored. As depicted in router 0, the data 432 may pass through multiplexing logic 436 at each router. The multiplexing logic 436 at each router is configured based on direction information generated in response to the reservation request 404. Multiplexing logic 436 may act to couple an input port of a router to the correct output port of the router to allow the data 432 to travel the correct path from source logic 408 to destination logic 412.

After the circuit-switched data 432 reaches the destination logic 412, a circuit-switched acknowledge signal 420 is sent from the destination logic 412 to the source logic 408. The acknowledge signal 420 confirms receipt of a segment of circuit-switched data 432. In some embodiments, two different acknowledge signals may be sent (one in response to stream signals and one in response to tail signals) with the tail acknowledgement signal indicating the end of the data transfer. The acknowledge signal 420 is flopped at the destination logic 412 and then again at the source logic 408, but is passed through the various routers of the network without being stored. As depicted in router 0, the acknowledge signal 420 may pass through multiplexing logic 428 at each router. The multiplexing logic 428 at each router is configured based on direction information generated in response to the reservation request 404. Multiplexing logic 428 may act to couple an input port of a router to the correct output port of the router to allow the acknowledge signal 420 to travel the correct path from destination logic 412 to source logic 408. As the final acknowledgement signal 420 travels from destination logic 412 to source logic 408, it tears down the circuit-switched channel as it passes through each router.

In various embodiments, a circuit-switched data transmission in system 400 may take place concurrently with an exchange of one or more packet-switched requests for circuit-switched paths to be configured. Accordingly, a router participating in the circuit-switched exchanges may prepare for future circuit-switched path configurations by determining and storing the routing direction for a future data transmission.

Figure 4B:
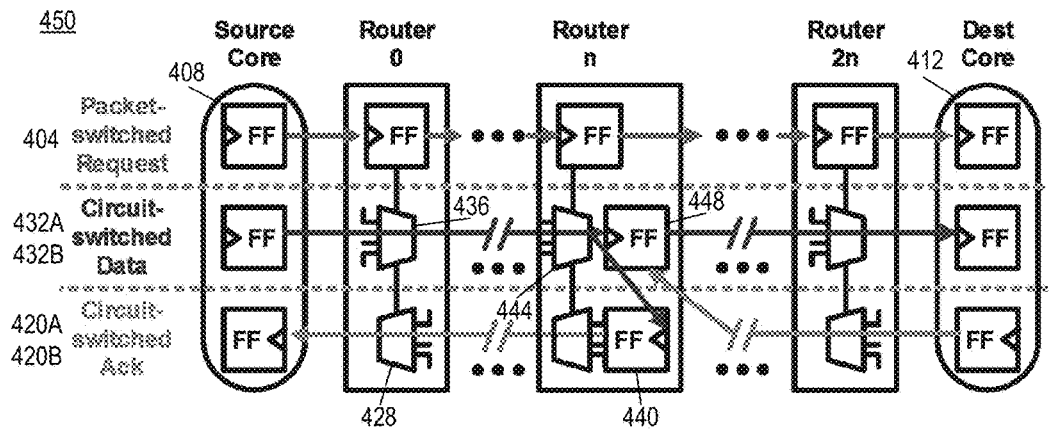
FIG. 4B illustrates an example system with pipelined circuit-switched control and data channels for a source-synchronous hybrid packet/circuit-switched NoC in accordance with certain embodiments.

FIG. 4B illustrates an example system 450 with pipelined circuit-switched control and data channels for a source-synchronous hybrid packet/circuit-switched NoC in accordance with certain embodiments. In the embodiment depicted, a pipeline stage is inserted in the middle of the circuit switched channels at router n. As in the non-pipelined system, packet-switched requests 304 propagate from source logic 308 to destination logic 312, reserving the circuit-switched channel along the way. In the pipelined embodiment, however, circuit-switched data 432A may begin propagating between the source logic 308 to the pipeline boundary in the middle (at router n) after the request packet passes the pipeline boundary if resources are available to form a circuit-switched channel between the source logic 308 and the pipeline boundary. In some situations, the transfer of circuit-switched data 432A may be delayed by one or more other circuit-switched data transfers utilizing resources needed to transfer data 432A in which case the circuit-switched data 432A will be transferred once the other transfers are complete. The data 432A passes through multiplexing logic 436 at each router up to router n without being stored and is then stored at router n (e.g., via flip flops 448). When the data 432A is received at router n, it triggers the sending of a circuit-switched acknowledgement signal 420A from a flip flop 440 of router n to the source logic 408. If the circuit-switched acknowledgment signal 420A is a tail acknowledgement signal, it may tear down the circuit-switched channel between router n and the source logic 408 as it propagates towards the source. Otherwise, the acknowledgement signal 420A may trigger the sending of the next circuit-switched data in the stream from source logic 408 to router n.

The data 432A is held at router n until the request packet 404 arrives at the destination logic 412. Circuit-switched data 432B (which has the same content as 432A but is sent later in time) is propagated between the pipeline boundary in the middle (at router n) to the destination logic 412 after the request packet reaches the destination logic 412 (once resources for a circuit-switched channel between the source logic 308 and the pipeline stage are available). The data 432B passes through multiplexing logic 436 at each router between router n and the destination logic without being stored until it is flopped at the destination logic 412. After the data 432B is received at the destination logic 412, a circuit-switched acknowledgement signal 420B is sent from a flip flop of the destination logic 412 to the pipeline boundary at router n. If the circuit-switched acknowledgment signal 420B is a tail acknowledgement signal, it may tear down the circuit-switched channel between the destination logic 412 and router n as it propagates towards router n. Otherwise, the acknowledgement signal 420A may trigger the sending of the next circuit-switched data in the stream from router n to the destination logic 412. This particular embodiment doubles the throughput of the channel for a low power overhead of flip-flops only in the pipeline router n. Although, the embodiment depicted shows a single pipeline stage, any suitable number of pipeline stages may be used in the NoC and may be placed at any suitable locations.

Figure 5A:
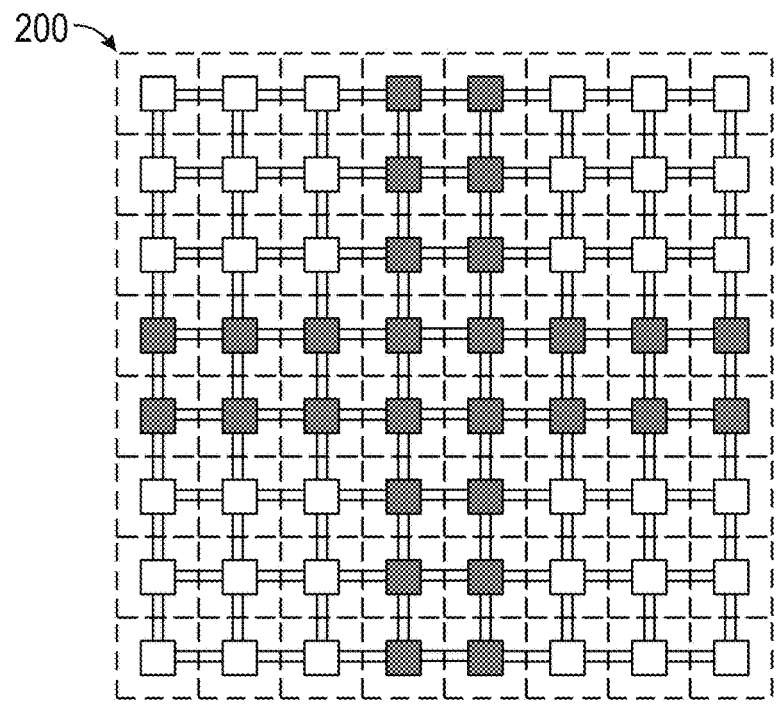
FIG. 5A illustrates an example configuration of pipeline stages in an NoC in accordance with certain embodiments.

FIG. 5A illustrates an example configuration of pipeline stages in an NoC in accordance with certain embodiments. In the embodiment depicted, the routers that include one or more pipelined stages (i.e., storage elements to hold circuit-switched data and control signals) are depicted in black, while routers without pipelined stages are in white. A router may include one or more pipeline stages that are each associated with a port of the router. For example, a router may include a pipeline stage at or otherwise associated with one port of the router, another pipeline stage at or otherwise associated with another port of the router, and so on. In an embodiment, the routers with pipelined stages are located as close to the horizontal center and the vertical center of the system as possible. In particular embodiments, the pipelined routers that run horizontally may pipeline circuit-switched data that travels north and/or south through the routers, but not pipeline data that runs east or west through the routers (in order to avoid pipelining data that runs across the line multiple times). Similarly, the pipelined routers that run vertically may pipeline circuit-switched data that runs east and/or west through the routers, but not pipeline data that runs north or south through the routers. In the embodiment depicted, the top row of the pipelined routers that run horizontally may each include a pipeline stage in the south out port of the router, while the bottom row of the pipelined routers that run horizontally may each include a pipeline stage in the north out port of the router. In a similar fashion, the left column of the pipelined routers that run vertically may each include a pipeline stage in the east out port of the router, while the right column of the pipelined routers that run vertically may each include a pipeline stage in the west out port of the router. Using a similar technique to that shown in FIG. 5A, a large 16×16 NoC can be divided into four 8×8 equivalent NoCs through the use of circuit-switched pipelining at 8×8 boundaries. In particular embodiments, the pipeline stages may be placed in between the routers at the boundaries instead of within the routers.

Figure 5B:
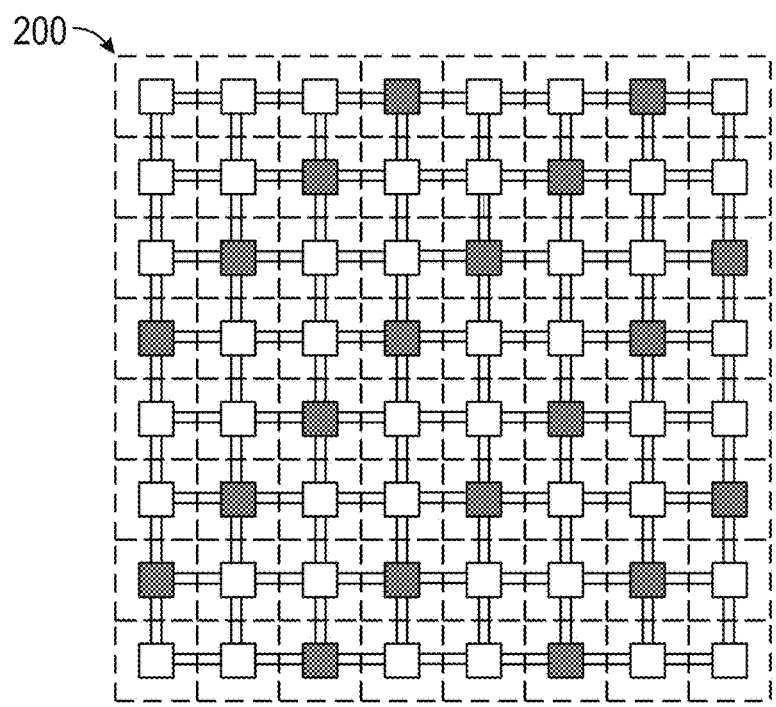
FIG. 5B illustrates another example configuration of pipeline stages in an NoC in accordance with certain embodiments.

FIG. 5B illustrates another example configuration of pipeline stages in an NoC in accordance with certain embodiments. In the embodiment shown, pipelined routers are placed in diagonal lines across the NoC, with the diagonal lines separated by three routers. In other embodiments, the distance between the diagonal lines may be any other suitable number of routers. Such an embodiment ensures that circuit-switched data does not travel more than a particular number of hops before being pipelined (in this case data may travel a maximum of four hops before being pipelined). In this embodiment, a router may pipeline data travelling in any direction through the router.

FIGS. 5A and 5B are merely examples of configurations of pipeline stages in an NoC. Other embodiments may include pipeline stages located at any suitable location of an NoC. In various embodiments, the locations of the pipeline stages are static. In other embodiments, the locations of the pipeline stages may be dynamic. For example, pipeline stages located throughout the NoC (e.g., in every router, every other router, etc.) may have control logic that can turn the pipeline stages on or off (if the pipeline stage is off, data may pass through the router without being stored). In some embodiments, the NoC may include logic to determine optimal placement of the pipeline stages and may communicate with the control logic for various pipelines stages to selectively turn particular pipeline stages on or off to achieve the optimal configuration. In particular embodiments, reservation packets may include information regarding where pipelining of circuit-switched data associated with the reservation should occur. For example, the reservation packet may indicate how many hops the circuit-switched data may travel before it should be pipelined or the reservation packet may indicate a particular router at which the circuit-switched data should be pipelined. As another example, a reservation packet may include a path selected by logic of the NoC that ensures that at least one static or dynamic pipeline stage is traversed.

Figure 6:
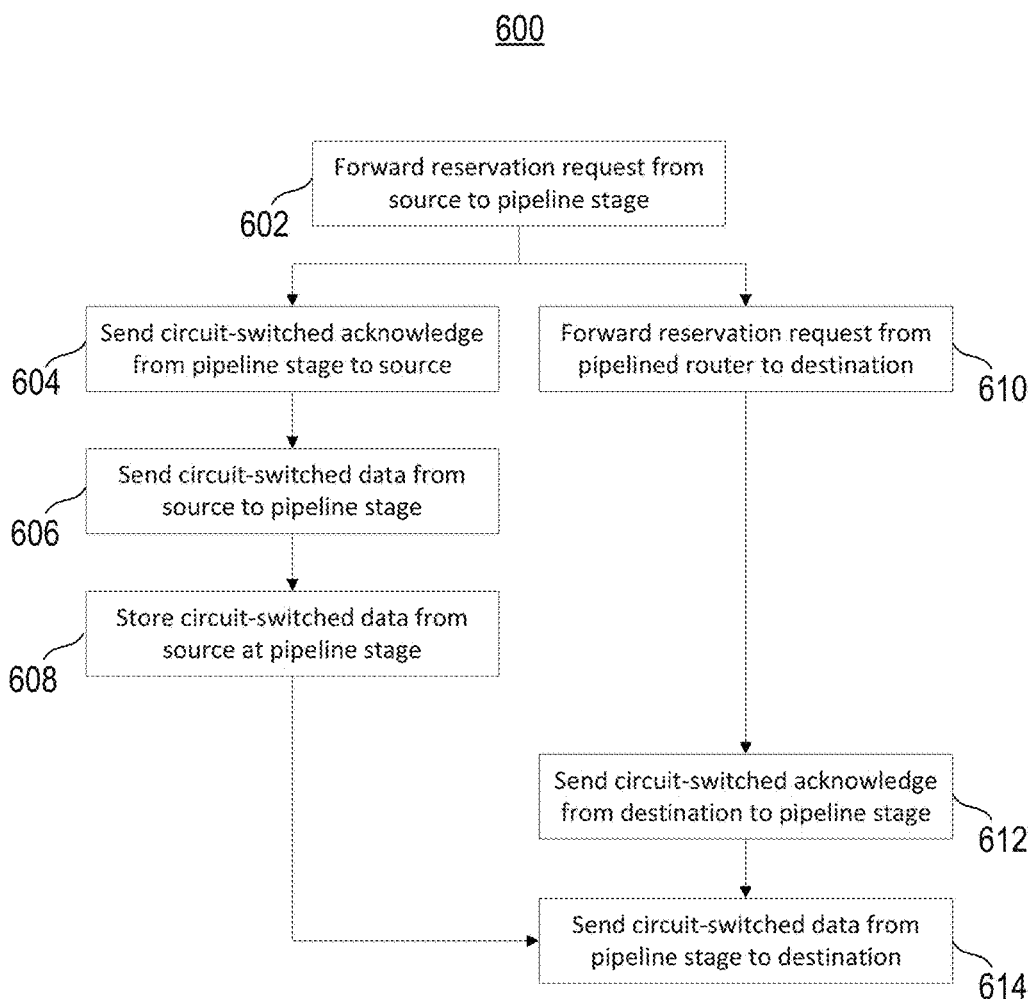
FIG. 6 illustrates an example method for communicating in a pipelined synchronous hybrid packet/circuit-switched NoC in accordance with certain embodiments.

FIG. 6 illustrates an example method 600 for communicating in a pipelined synchronous hybrid packet/circuit-switched NoC in accordance with certain embodiments. At step 602, a packet-switched reservation request is forwarded from source logic to a pipeline stage. The reservation request may pass through any suitable number of routers on its way from the source to the destination and may be flopped at each router. After the reservation request reaches the pipeline stage, a circuit-switched acknowledge signal is sent from the pipeline stage to the source logic at step 604, indicating that the channel is ready for circuit-switched data. Meanwhile, the reservation request continues towards the destination logic at step 610.

At step 606, after receiving the acknowledge signal, the source logic sends circuit-switched data to the pipeline stage. At step 608 the circuit-switched data is stored at the pipeline stage and the pipeline stage waits for an acknowledge signal. At step 612, a circuit-switched acknowledge is sent from the destination to the pipeline stage. The circuit-switched data is then sent to the destination logic from the pipeline stage at step 614.

Method 600 may be used for communicating circuit-switched data between any number of pipeline stages. For example, the method would be the same if the pipeline stage was a first pipeline stage and the destination were replaced with a second pipeline stage. The reservation packet would propagate up to the first pipeline stage, an acknowledgement would be sent back to the source, and the data would be sent to the first pipeline stage and stored. After the reservation request propagated to the second pipeline stage, an acknowledgement would be sent back to the first pipeline stage, and the data would be sent from the first pipeline stage to the second pipeline stage. This method could be repeated for any number of pipeline stages until the last pipeline stage sends the data to the destination logic.

Some of the steps illustrated in FIG. 6 may be combined, modified or deleted where appropriate, and additional steps may also be added to the flowchart. Additionally, steps may be performed in any suitable order without departing from the scope of particular embodiments.

Figure 7:
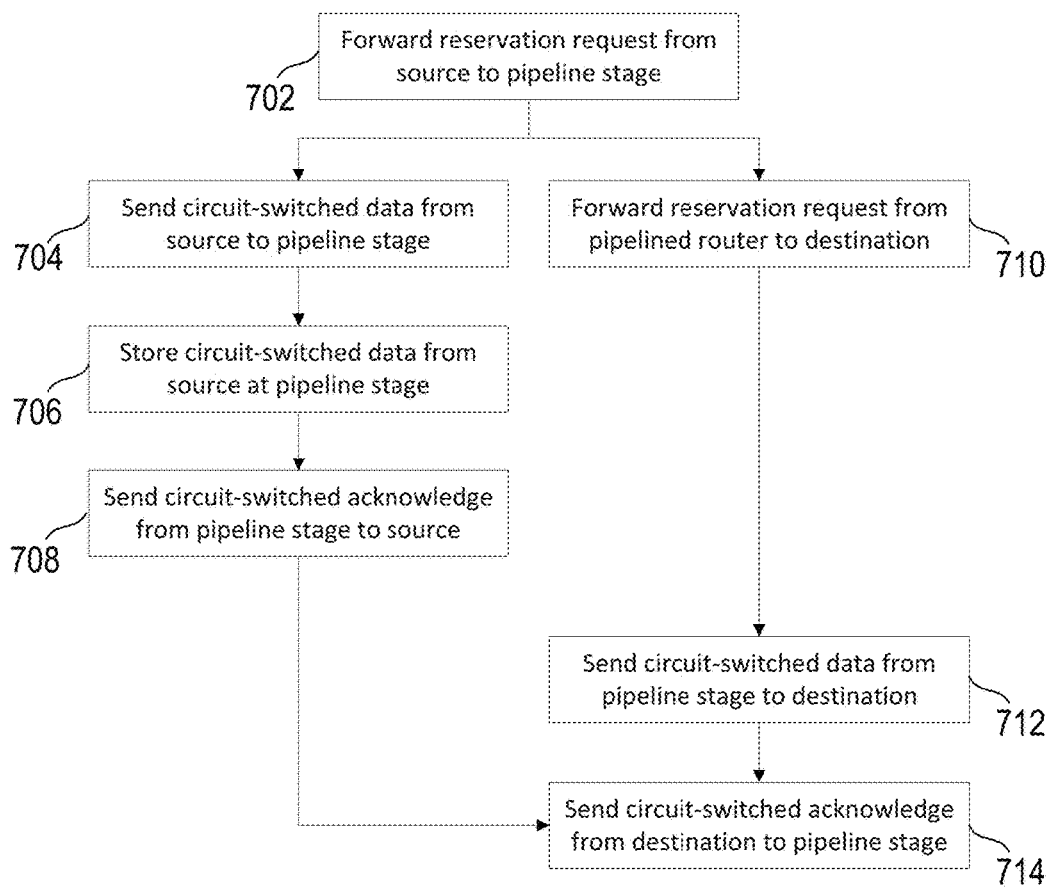
FIG. 7 illustrates an example method for communicating in a pipelined source-synchronous hybrid packet/circuit-switched NoC in accordance with certain embodiments.

FIG. 7 illustrates an example method 700 for communicating in a pipelined source-synchronous hybrid packet/circuit-switched NoC in accordance with certain embodiments. At step 702, a packet-switched reservation request is forwarded from source logic to a pipeline stage. The reservation request may pass through any suitable number of routers on its way from the source to the destination and may be flopped at each router. After the reservation request reaches the pipeline stage, circuit-switched data is sent from the source logic to the pipeline stage at step 704. In some embodiments, the transfer of the circuit-switched data may begin before the reservation request reaches the pipeline stage, but the channel is only configured up to the last router that has processed the packet-switched request. Thus, the circuit-switched data will not be received at the pipeline stage until after the packet-switched request has reached the pipeline stage. Meanwhile, the reservation request continues towards the destination logic at step 710.

At step 706 the circuit-switched data is stored at the pipeline stage and the pipeline stage waits for an acknowledge signal from the destination logic. At step 708, after receiving the data, the pipeline stage sends a circuit-switched acknowledgement signal to the source logic. At step 712, the circuit-switched acknowledge signal is sent from the destination logic to the pipeline stage. The circuit-switched data is then sent to the destination logic from the pipeline stage at step 714.

Method 700 may be used for communicating circuit switched data through any suitable number of pipeline stages. For example, the method would be the same if the pipeline stage was a first pipeline stage and the destination were replaced with a second pipeline stage. The reservation packet would propagate up to the first pipeline stage, data would be sent from the source to the first pipeline stage where it would be stored, and an acknowledgement would be sent back to the source. After the reservation request propagated to the second pipeline stage, data would be sent from the first pipeline stage to the second pipeline stage and stored, and an acknowledgement would be sent back to the first pipeline stage. This method could be repeated for any number of pipeline stages until the last pipeline stage sends the data to the destination logic.

Some of the steps illustrated in FIG. 7 may be combined, modified or deleted where appropriate, and additional steps may also be added to the flowchart. Additionally, steps may be performed in any suitable order without departing from the scope of particular embodiments.

Figure 8:
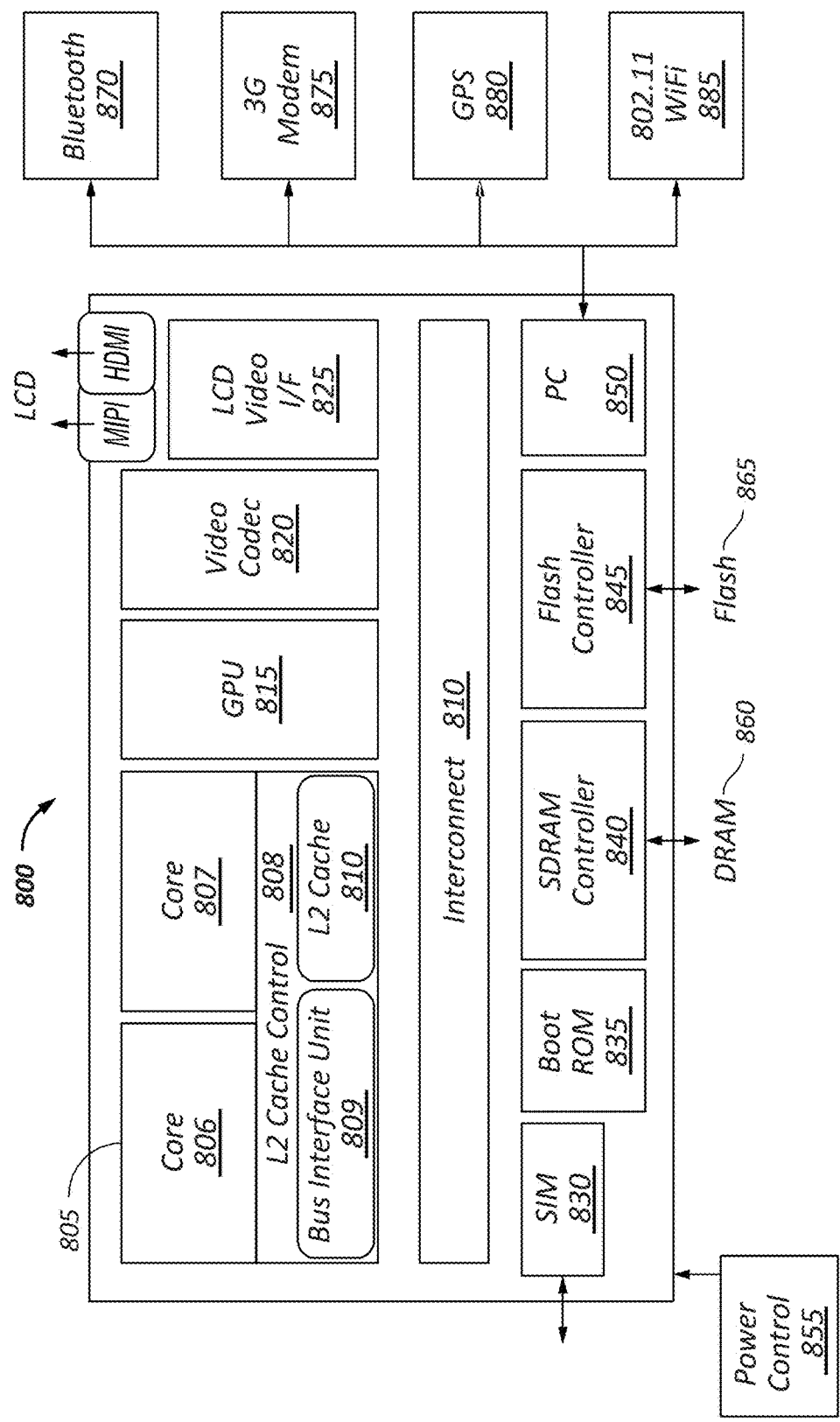
FIG. 8 illustrates another block diagram for an example computing system in accordance with certain embodiments.

FIG. 8 illustrates another embodiment of a block diagram for an example computing system in accordance with one embodiment. In this figure, an embodiment of a system on-chip (SOC) design in accordance with the disclosures is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described disclosure.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control Q1650 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system illustrates peripherals for communication, such as a Bluetooth module 870, 3G modem 875, GPS 885, and WiFi 885. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a router), a method, and a non-transitory machine readable medium (including information to represent structures, when manufactured, to be configured) to receive a packet-switched request from another router of a network-on-chip, the packet-switched request to be generated at source logic, the packet-switched request identifying destination logic; receive circuit-switched data associated with the packet-switched request through a first circuit-switched channel; store the circuit-switched data associated with the packet-switched request; and send the stored circuit-switched data towards the destination logic identified in the packet-switched request.

In at least one example, the apparatus is a processor.

In at least one example, a router is to send a circuit-switched acknowledgement signal to the source logic.

In at least one example, a reception of the circuit-switched acknowledgement signal by the source logic is to trigger transmission of the circuit-switched data to the router.

In at least one example, the circuit-switched acknowledgement signal is to be sent after the router receives the circuit-switched data.

In at least one example, the router is to store the circuit-switched data in a set of flip flops.

In at least one example, the router is to send the stored circuit-switched data to the destination logic after the packet-switched request reaches the destination logic.

In at least one example, the router is to send the stored circuit-switched data to a second router of the network-on-chip to be stored at the second router after the packet-switched request reaches the second router.

In at least one example, the router is to be selectively configured to store the circuit-switched data or to forward the circuit-switched data towards the destination logic without storing the circuit-switched data.

One or more embodiments may provide an apparatus, a system, a machine readable storage, a machine readable medium, hardware- and/or software-based logic (e.g., a router), a method, and a non-transitory machine readable medium (including information to represent structures, when manufactured, to be configured) to comprise an input port to receive a packet-switched request from a first router of a network-on-chip, the packet-switched request to be generated by source logic of the network-on-chip, and to receive circuit-switched data associated with the packet switched request; a storage element to store the circuit-switched data; and an output port to send the circuit-switched data towards destination logic identified in the packet-switched request.

In at least one example, the input port is to receive the circuit-switched data through a circuit-switched channel formed between the source logic and the apparatus.

In at least one example, the output port is to send the circuit-switched data through a circuit-switched channel formed between the apparatus and the destination logic.

In at least one example, the output port is to receive a circuit-switched acknowledge signal associated with circuit-switched data, the circuit-switched acknowledge signal to be received through a circuit-switched channel formed between the apparatus and the destination logic.

In at least one example, the circuit-switched data is sent to a second router of the network-on-chip through a circuit-switched channel formed between the apparatus and the second router, wherein the circuit-switched data is to be stored by the second router.

One or more embodiments may provide an apparatus, a system, a machine readable storage, a machine readable medium, hardware- and/or software-based logic (e.g., a router), a method, and a non-transitory machine readable medium (including information to represent structures, when manufactured, to be configured) to receive, at a first router of a network-on-chip, a packet-switched request from a second router of a network-on-chip, the packet-switched request to be generated by source logic of the network-on-chip; store the circuit-switched data at the first router; and send the circuit-switched data from the first router towards destination logic identified in the packet-switched request.

In at least one example, the circuit-switched data is to be received through a circuit-switched channel formed between the source logic and the first router.

In at least one example, the circuit-switched data is to be sent through a circuit-switched channel formed between the first router and the destination logic.

In at least one example, a circuit-switched acknowledge signal associated with the circuit-switched data is received through a circuit-switched channel formed between the apparatus and the destination logic.

In at least one example, sending the circuit-switched data towards the destination logic comprises sending the circuit-switched data to a second router of the network-on-chip through a circuit-switched channel formed between the first router and the second router, wherein the circuit-switched data is to be stored by the second router.

In at least one example, the first router is to store the circuit-switched data or to forward the circuit-switched data towards the destination logic without storing the circuit-switched data.

One or more embodiments may provide an apparatus, a system, a machine readable storage, a machine readable medium, hardware- and/or software-based logic (e.g., a router), a method, and a non-transitory machine readable medium (including information to represent structures, when manufactured, to be configured) to comprise a plurality of cores; a plurality of routers associated with the plurality of cores, the plurality of routers to implement a network-on-chip. A router is to receive a packet-switched request from another router of the network-on-chip, the packet-switched request to be generated at a source core of the plurality of cores, the packet-switched request identifying a destination core of the plurality of cores; receive circuit-switched data associated with the packet-switched request through a first circuit-switched channel; store the circuit-switched data associated with the packet-switched request; and send the stored circuit-switched data towards the destination core identified in the packet-switched request.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
    a first router of a network-on-chip, the first router to:
        receive a packet-switched request from a second router of the network-on-chip, the packet-switched request to be generated at source logic, the packet-switched request identifying destination logic;
        receive circuit-switched data associated with the packet-switched request through a first circuit-switched channel;
        store the circuit-switched data associated with the packet-switched request;
        send the stored circuit-switched data towards the destination logic identified in the packet-switched request; and
        send a first circuit-switched acknowledgment signal associated with the packet-switched request to the source logic prior to reception of a second circuit-switched acknowledgment signal associated with the packet-switched request.

2. The processor of claim 1, wherein a reception of the first circuit-switched acknowledgement signal by the source logic is to trigger transmission of the circuit-switched data to the router.

3. The processor of claim 1, wherein the first circuit-switched acknowledgement signal is to be sent after the first router receives the circuit-switched data.

4. The processor of claim 1, wherein the first router is to store the circuit-switched data in a set of flip flops.

5. The processor of claim 1, wherein the first router is to send the stored circuit-switched data to the destination logic after the packet-switched request reaches the destination logic.

6. The processor of claim 1, wherein the first router is to send the stored circuit-switched data to a third router of the network-on-chip to be stored at the third router after the packet-switched request reaches the third router.

7. The processor of claim 1, wherein the first router is to be selectively configured to store the circuit-switched data or to forward the circuit-switched data towards the destination logic without storing the circuit-switched data.

8. An apparatus comprising:
    a first input port to:
        receive a packet-switched request from a first router of a network-on-chip, the packet-switched request to be generated by source logic of the network-on-chip; and
        receive circuit-switched data associated with the packet switched request;
    a storage element to store the circuit-switched data;
    a first output port to send the circuit-switched data towards destination logic identified in the packet-switched request; and
    a second output port to send a first circuit-switched acknowledgment signal associated with the packet-switched request to the source logic prior to a second circuit-switched acknowledgment signal associated with the packet-switched request being received at a second input port of the apparatus.

9. The apparatus of claim 8, wherein the first input port is to receive the circuit-switched data through a circuit-switched channel formed between the source logic and the apparatus.

10. The apparatus of claim 8, wherein the first output port is to send the circuit-switched data through a circuit-switched channel formed between the apparatus and the destination logic.

11. The apparatus of claim 8, wherein the second input port is to receive the second circuit-switched acknowledge signal, the circuit-switched acknowledge signal to be received through a circuit-switched channel formed between the apparatus and the destination logic.

12. The apparatus of claim 8, wherein the apparatus is to send the circuit-switched data to a second router of the network-on-chip through a circuit-switched channel formed between the apparatus and the second router, wherein the circuit-switched data is to be stored by the second router.

13. A non-transitory machine readable medium including information to represent structures, when manufactured, to be configured to:

receive, at a first router of a network-on-chip, a packet-switched request from a second router of a network-on-chip, the packet-switched request to be generated by source logic of the network-on-chip;

store circuit-switched data at the first router;

send the circuit-switched data from the first router towards destination logic identified in the packet-switched request; and send a first circuit-switched acknowledgment signal associated with the packet-switched request to the source logic prior to reception of a second circuit-switched acknowledgment signal associated with the packet-switched request.

14. The medium of claim 13, wherein the circuit-switched data is to be received through a circuit-switched channel formed between the source logic and the first router.

15. The medium of claim 13, wherein the circuit-switched data is to be sent through a circuit-switched channel formed between the first router and the destination logic.

16. The medium of claim 13, the structures, when manufactured, to be further configured to receive the second circuit-switched acknowledge signal through a circuit-switched channel formed between the first router and the destination logic.

17. The medium of claim 13, wherein sending the circuit-switched data towards the destination logic comprises sending the circuit-switched data to a second router of the network-on-chip through a circuit-switched channel formed between the first router and the second router, wherein the circuit-switched data is to be stored by the second router.

18. The medium of claim 13, the structures, when manufactured, to be configured to further selectively configure the first router to store the circuit-switched data or to forward the circuit-switched data towards the destination logic without storing the circuit-switched data.

19. A system comprising:

a plurality of cores;

a plurality of routers associated with the plurality of cores, the plurality of routers to implement a network-on-chip, wherein a router of the plurality of routers is to:

receive a packet-switched request from another router of the network-on-chip, the packet-switched request to be generated at a source core of the plurality of cores, the packet-switched request identifying a destination core of the plurality of cores;

receive circuit-switched data associated with the packet-switched request through a first circuit-switched channel;

store the circuit-switched data associated with the packet-switched request;

send the stored circuit-switched data towards the destination core identified in the packet-switched request; and send a first circuit-switched acknowledgment signal associated with the packet-switched request to the source core prior to reception of a circuit-switched acknowledgment signal associated with the packet-switched request.

\* \* \* \* \*